United States Patent [19]

Chen

[11] Patent Number: 4,539,901
[45] Date of Patent: Sep. 10, 1985

[54] PORTABLE BARBECUE GRILL

[76] Inventor: Ming-Tang Chen, No. 14, Alley 89, Lane 59, Nan-Man Rd., Taichung, Taiwan

[21] Appl. No.: 526,885

[22] Filed: Aug. 26, 1983

[51] Int. Cl.³ .............................................. A47J 37/04
[52] U.S. Cl. .................................. 99/393; 99/443 R; 99/448; 99/449; 99/450; 126/9 B; 126/25 R; 126/41 A; 126/338
[58] Field of Search ................. 99/393, 395, 427, 448, 99/449, 450, 443 R; 126/25 AA, 9 R, 9 B, 41 A, 304 A, 338, 25 R

[56] References Cited

U.S. PATENT DOCUMENTS

| 3,973 | 3/1845 | Hawkins | 99/450 |
|---|---|---|---|
| 199,870 | 1/1878 | Smith | 126/338 |
| 231,141 | 8/1880 | Avery | 126/338 |
| 1,043,385 | 11/1912 | Amspacher | 126/338 |
| 1,351,394 | 8/1920 | Martin | 126/338 |
| 1,552,854 | 9/1925 | James | 126/25 AA |
| 2,477,529 | 7/1949 | Sprinkle et al. | 99/450 |
| 2,477,721 | 8/1949 | Chesser et al. | 99/450 X |
| 3,512,515 | 5/1970 | McGee | 126/25 AA |
| 4,457,219 | 7/1984 | Chen | 126/338 X |

FOREIGN PATENT DOCUMENTS 52661 5/1910 Switzerland ......................... 126/338

Primary Examiner—Billy J. Wilhite
Attorney, Agent, or Firm—Watson, Cole, Grindle & Watson

[57] ABSTRACT

A portable barbecue grill includes an upwardly open container, legs pivotally connected to the container which can be positioned to support the container above the ground or folded up against the container, a mounting element having upwardly-extending sockets positionable within the container, tubular pipes positionable on the upwardly-extending sockets, and rack elements rotatably mounted on the upper ends of the tubular pipes, each rack element including a circular food-supporting grate, each grate having teeth extending outwardly of its periphery which are engageable with the teeth of at least one adjacent grate, such that rotation of one rack element will cause rotation of the adjacent rack elements with which its grate is interconnected.

11 Claims, 7 Drawing Figures

PORTABLE BARBECUE GRILL

BACKGROUND OF THE INVENTION

The present invention relates to portable barbecue grills which are designed for outdoor use.

Barbecue grills which are sufficiently compact and light in weight that they can be easily taken to a picnic or camp site to cook foods have become very popular lately, in part because they make these activities, which are very important to people in today's industrial society, more predictable and enjoyable.

However, the known portable barbecue grills have fixed grates and thus they can not be very easily adjusted so as to control the degree to which the food positioned thereon is exposed to the fuels (charcoal) burning therein.

SUMMARY OF THE INVENTION

It is an object of the present invention to provide a barbecue grill which is light in weight and which can be easily folded into a compact form, thus making it easily portable.

It is a further object of the present invention to provide a barbecue grill which includes a food-supporting grate whose positioning with respect to the fuels burning in the grill can be adjusted, thus enabling a better control of the cooking of the food on the grate and providing a more delicious and desirable food product.

It is a further object of the present invention to provide a barbecue grill which includes multiple food-supporting grills which are interconnected and which can be rotated, such that manual rotation of one grill will cause a rotation of the other grills interconnected therewith.

The foregoing objects are achieved by a portable barbecue grill which includes a container for containing the fuel (charcoal) to be burned, legs pivotally connected to the container for supporting it above the ground, and a plurality of rack elements for supporting the food to be cooked above the fuel in the container, the rack elements each being rotatable and each including a generally flat food-supporting grate which has teeth extending outwardly therefrom, the teeth of the grates being interengageable with one another such that rotation of one rack element will cause simultaneous rotation of each of the other rack elements. The barbecue grill can be reduced in size for easily transport by pivoting the legs so as to contact the container and individually positioning the rack element within the container.

A further understanding of the invention will now be had by reference to the attached drawings, taken in conjunction with the following discussion.

DETAILED DESCRIPTION OF THE PREFERRED EMBODIMENTS

Figure 1:
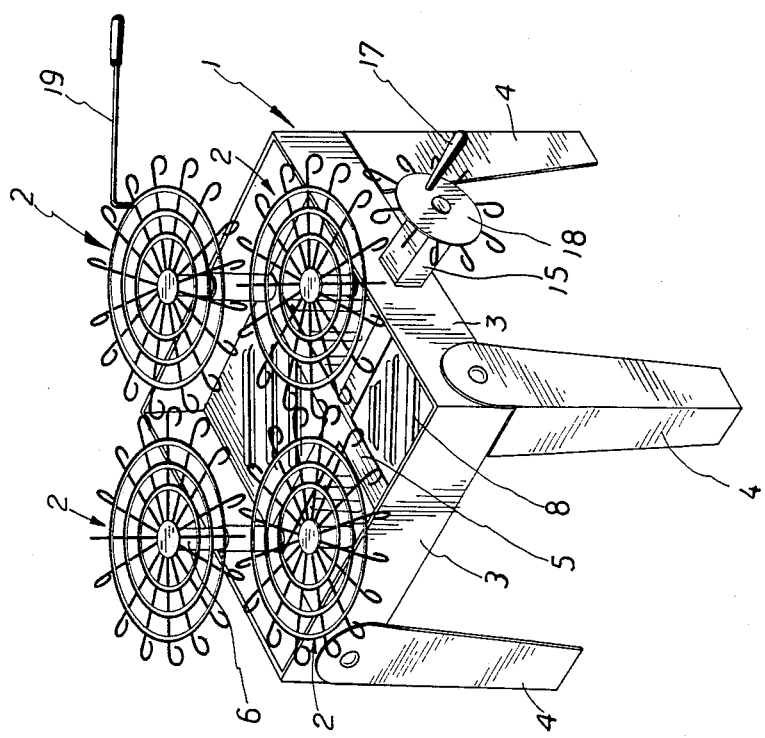
FIG. 1 shows a top perspective view of one embodiment of portable barbecue grill according to the present invention, i.e., when ready for use.
Figure 2:
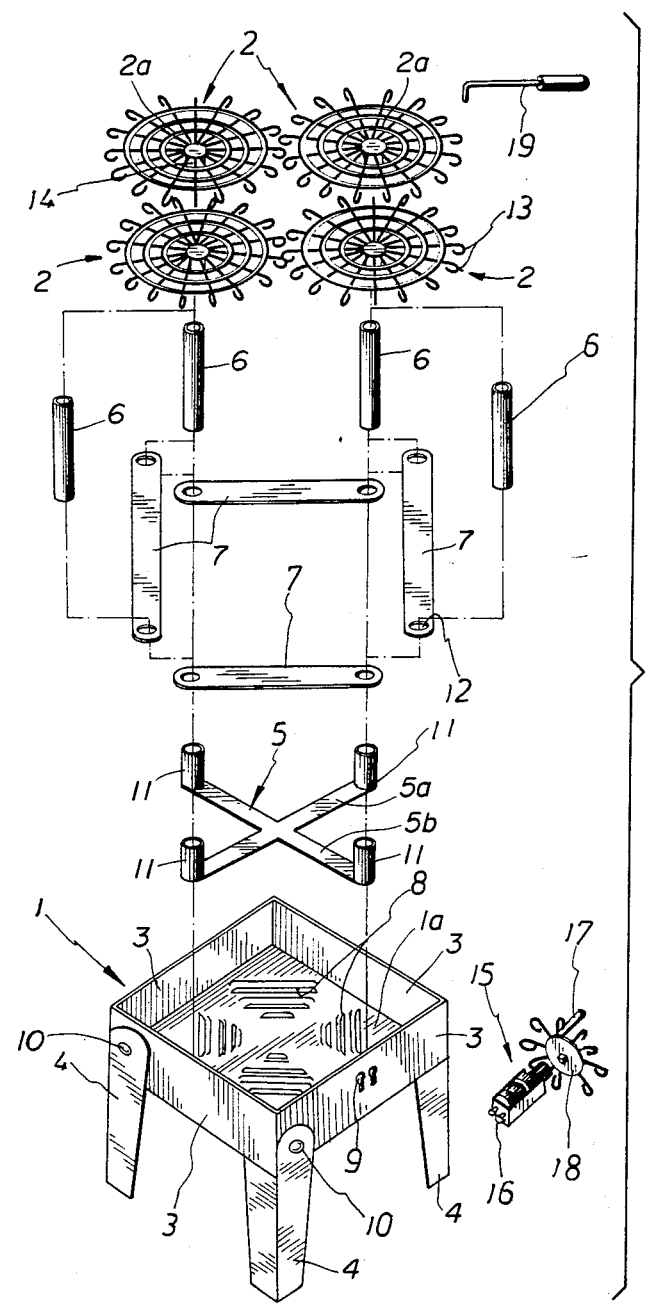
FIG. 2 shows an exploded view of the portable barbecue grill shown in FIG. 1.

A portable barbecue grill which is constructed in accordance with a preferred embodiment of the present invention is shown in FIGS. 1 and 2. It is seen to include an upwardly open container 1 which is defined by a rectangular (square floor) 1a made of a steel plate and having ventilating perforations in the form of cross groove holes 8 therein and four side walls 3. The side walls 3 are welded to the edges of the floor 1a. Four foldable legs 4 are connected to the container 1 to support it above the ground. More particularly, each of the legs 4 includes an upper end which is pivotally connected by a rivet 10 to a lower left corner of the associated side wall 3 of the container 1, and a free end, the free end contacting the ground when the leg is pivoted to operatively extend perpendicularly to the floor element 1a, or else contacting the container when pivoted upwardly to extend in parallel with the floor element (this is its stored position-see FIG. 5). Each of the legs 4 is made of a pressed metal plate which is shaped such that, when positioned in its stored position, it will contact both the floor element 1a and the side wall 3 to which its upper end is connected.

Positioned on the floor element 1a within the container 1 is a cast mounting element 5 which includes arms 5a and 5b that are integrally connected at their centers and which extend perpendicularly to one another, each arm mounting an upwardly extending, generally tubular socket 11 at each of its opposite ends. A separate pipe 6 is removably mounted in each of the upwardly extending sockets 11. The pipes 6 are identical and are sufficiently elongated to extend above the adjacent side walls of the container 1. Four flat metallic fixing bars 7, each having holes in its opposite ends which are large enough in diameter to fit around a respective pipe 6, are connected between two respective pipes extending upwardly from respective upwardly-extending tubular sockets at the associated ends of the two arms 5a and 5b. These fixing bars provide a square frame which stabilizes the vertical positioning of the pipes 6 within the container 1.

Mounted above each pipe 6 is a separate rack element 2, each rack element including a generally flat, circular foodsupporting grate 2a and a support element in the form of an axle 14 which is connected to the center of the associated grate to extend perpendicularly with respect thereto, the support element of each rack element being removably mounted in and rotatable with respect to the upper end of an associated pipe 6. Each grate 2a is made of a plurality of radially-extending steel wires which are reinforced by a plurality of annular rings, and each is sufficiently large in diameter to include a portion which extend beyond the adjacent side wall 3 of the container 1. The ends of the radially-extending wires extend outwardly of the outermost annular ring and are bent into vertical ring shapes to provide teeth 14, the teeth of the adjacent grates being interengageable such that rotation of one rack element will cause simultaneous rotation of the adjacent rack element.

One side wall 3 of the container 1 includes two key-shaped holes 9, and an adjustment means in the form of a mounting box 15 can be attached to the external side of the side wall 3 via two screws 16 that engage within the holes 9, the mounting box 15 having a toothed wheel 8 with handle 9 rotatably connected thereto. The teeth of the wheel 18 are interengageable with the teeth 13 of the grate of the nearest rack element at a point beyond the side wall 3.

As shown in FIGS. 1 and 2, the portable barbecue grill can also include an accessory rod 19 for rotating one of the rack elements (and thus all of the rack elements) as an alternative to using the adjusting means discussed above.

In operation, fuel is placed on the floor 3a of the container 1 and is ignited, and food is placed on the grates 2a of the rack elements 2 and cooked. At appropriate times the toothed wheel 18 is manually rotated via handle 19 (or the rod 19 used), causing the grates 2a to rotate, thus relocating the food relative to the hottest part of the burning fuel. As such, a good control of the cooking of the food can be achieved.

All of the elements of the portable barbecue grill which are associated with the container 1, when disconnected from one another, can be positioned within the container 1, thus forming a compact, as well as a light weight unit. Of course, it is not necessary to detach the legs 4 from the container 1 since they can be pivoted into their stored positions as noted above.

Figure 3:
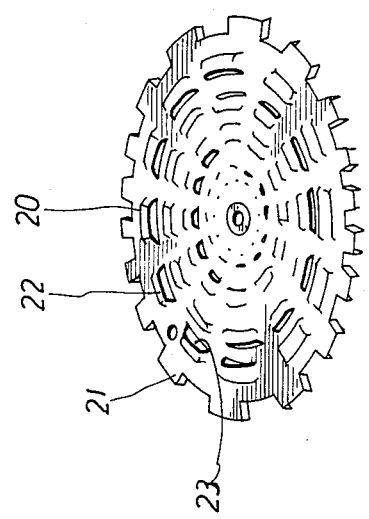
FIG. 3 shows a perspective view of one embodiment of a grate portion of a rack element usable in the portable barbecue grill of the present invention.
Figure 4:
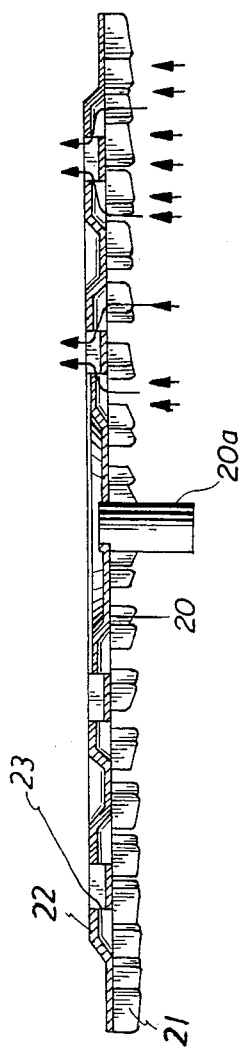
FIG. 4 shows a side view of the grate shown in FIG. 3.

Turning now to FIGS. 3 and 4, an alternate form of rack element 2 is shown, the grate 20 being in the form of a pressed steel sheet having bent flaps 22 with open sides which provide cross grooves 23 therein, as well as a teeth in the forms of tabs 21 formed around its periphery. Hot combustion gases from the fuel in the container 1 can flow through the cross grooves 23 as shown by the arrows in FIG. 3. The support elements of the grate 20 is provided by a tubular portion 20a.

Figure 5:
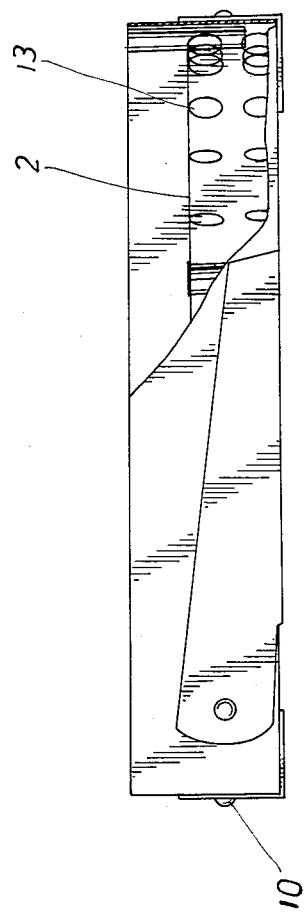
FIG. 5 shows a side view, partially broken away, of the container portion of the portable barbecue grill shown in FIG. 1 when the legs attached thereto are oriented to their stored position.

FIG. 5 shows the container 1 of the portable barbecue grill shown in FIG. 1 with the legs 3 folded in their stored positions, the rack elements 2 being shown positioned inside the container. In this compact configuration, the barbecue grill can be easily packaged in a flat paper box and carried.

Figure 6:
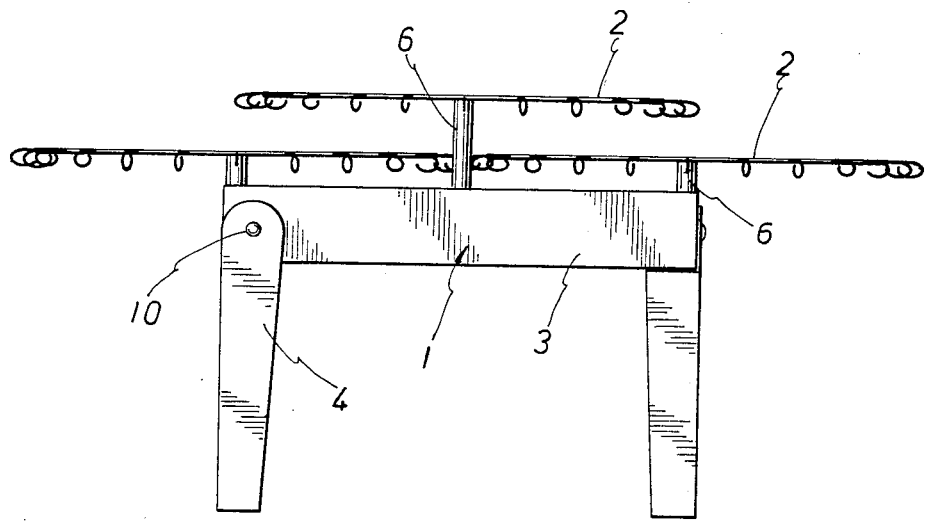
FIG. 6 shows a front view of another embodiment of a portable barbecue grill according to the present invention when ready for use.
Figure 7:
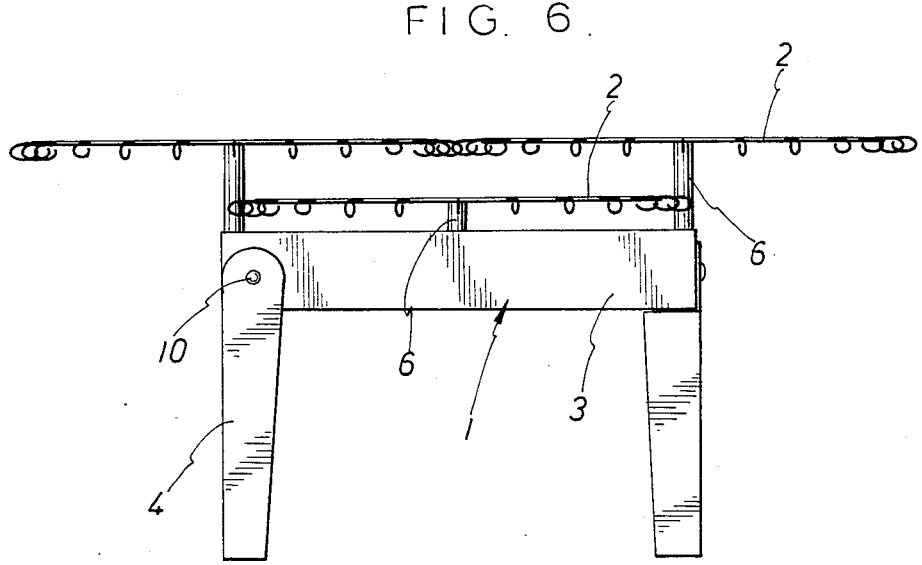
FIG. 7 shows a side view of the embodiment portable barbecue grill shown in FIG. 6.

FIGS. 6 and 9 show front and side views, respectively, of an alternate embodiment of the inventive portable barbecue grill. In this embodiment, the elements are the same as shown in FIG. 1 embodiment, except that pipes 6 attached to the upwardly-extending sockets 11 at the opposite ends of one of the arms 5a and 5b are longer than the other two pipes. As such, the grates 2a of two opposing rack elements 2 are located above the other two. At the same time, the diameters of the grates 2a are enlarged such that the teeth 13 of the grates 2a at the same height will engage with one another. The lower grates will provide a first food-supporting surface near the burning fuel in the container 1 and the higher grates will provide a second food-supporting surface farther from the burning fuel. The person using the portable barbecue grill can thus put the food to be cooked in the first, lower surface for faster cooking or on the second, higher surface for slower cooking, or back and forth from the first surface to the second surface, as desired.

Although two embodiments of the invention have been shown and described in detail, various changes can be made thereto, and still fall within the scope of the appended claims. For example, the container 1 need not be square in shape but can have other shapes, and more than four rack elements can be used to provide the grates on which the food to be cooked can be positioned.

I claim:

1. A portable barbecue grill which comprises
an upwardly open container defined by a floor element and at least one upwardly extending side wall, said container being capable of containing charcoal therein,
a plurality of leg elements pivotally attached to said container, said leg elements being movable from a first stored position wherein they extend in parallel to said floor element of said container to a second position where they extend perpendicularly to said floor element of said container,
a mounting element positioned on the floor element of said container for supporting separate grill elements thereabove, said mounting element comprising first and second arms which are connected at their centers and extend perpendicularly to one another, a generally tubular socket respectively mounted to the opposite ends of each of said first and second arms to extend upwardly with respect to said container, and a removable pipe respectively mounted in each of said upwardly-extending sockets, each said pipe extending upwardly to a point above the adjacent side wall of said container, and
four rack elements for supporting food above the charcoal in said container, each rack element including a generally flat food-supporting grate and a support element connected to said grate to extend perpendicularly with respect thereto, the support element of each rack element being removably mounted in and rotatable with respect to a respective pipe of said mounting element, and the generally flat grate of each rack element being sufficiently large to include a portion which extends beyond the adjacent side wall of said container and including teeth extending outwardly therefrom, the teeth of adjacent flat grates being interengageable such that the rotation of one rack element will cause simultaneous rotation of each adjacent rack element.

2. The portable barbecue grill as defined in claim 1 wherein the floor element of said container is rectangular in shape and wherein said container includes four upwardly extending side walls.

3. The portable barbecue grill as defined in claim 2, wherein four leg elements are respectively pivotally connected to said four side walls.

4. The portable barbecure grill as defined in claim 3, wherein each of said four leg elements includes an end which is pivotally connected to a side wall of said container and a free end, and wherein each of said four leg elements can be pivoted such that its free end can contact the floor element of said container.

5. The portable barbecue grill as defined in claim 1 wherein the floor element of said container includes perforations therein.

6. The portable barbecue grill as defined in claim 1 wherein the grate of each rack element comprises a perforated, circular metal plate having metal tabs radially outwardly extending from its periphery.

7. The portable barbecue grill as defined in claim 1, wherein the support element of each rack element comprises a wire axle.

8. The portable barbecue grill as defined in claim 1, which includes an adjustment means attached to said container to engage with the teeth of a grate, said adjustment means being capable of rotating one, and thus all, of the grates and thus determine the position of the food on the grates with respect to the charcoal in said container.

9. The portable barbecue grill as defined in claim 8, wherein said adjustment means includes a mounting box connected to an external side of a wall of said container, a toothed wheel rotatably connected to said mounting box, and a handle connected to said toothed wheel; the teeth of said toothed wheel being interengageable with the teeth of a grate at a point beyond the side wall of said container.

10. The portable barbecue grill as defined in claim 1, wherein said mounting element includes four fixing bars, each fixing bar including a hole in each of its opposite ends which is capable of fitting around one of said pipes, each said fixing bar being connected between two pipes extending upwardly from respective upwardly-extending tubular sockets at the ends of said first and second arms so as to stabilize said pipes.

11. The portable barbecue grill as defined in claim 1, wherein said first and second arms are integrally connected at their centers.

* * * * *